3,479,278
SOLVENT DEWAXING WITH HYDROGENATED
POLYMERIC DEWAXING AIDS
Albert N. DeVault, Bartlesville, Okla., assignor to Phillips
Petroleum Company, a corporation of Delaware
No Drawing. Filed June 7, 1967, Ser. No. 644,067
Int. Cl. C10g 43/12, 21/14
U.S. Cl. 208—33                                      8 Claims

ABSTRACT OF THE DISCLOSURE

Mineral oils are dewaxed by adding to the oil a dewaxing agent selected from hydrogenated polybutadiene, hydrogenated carboxylated polybutadiene, hydrogenated carboxylated butadiene-styrene copolymer, and combinations thereof. Polymerized pentadecylmethacrylate can be added to any of the above dewaxing agents as a synergistic supplemental dewaxing aid. After addition of the dewaxing aid, the oil is chilled to precipitate the wax therefrom.

Cross-references to related applications

The use of hydrogenated butadiene-styrene random copolymer as a wax crystal modifier in a dewaxing process is disclosed and claimed in copending application Ser. No. 586,635, filed Oct. 14, 1966, in which I am co-inventor with Marvin M. Johnson.

Background of the invention

This invention relates to dewaxing of mineral oils. In one aspect, it relates to the use of certain hydrogenated polymers of butadiene as wax crystal modifiers in a dewaxing process. In another aspect, it relates to the synergistic effect of polymers of esters of acrylic or alpha-methacrylic acid with primary alcohols having more than five carbon atoms, such as polymerized pentadecylmethacrylate, with certain hydrogenated polymers of butadiene when used as wax crystal modifiers in a dewaxing process. In another aspect, it relates to an improvement of the efficiency of filtration of precipitated wax from oil by precipitating the wax in the presence of a small amount of a wax crystal modifier selected from hydrogenated polybutadiene, hydrogenated carboxylated polybutadiene, hydrogenated carboxylated butadiene-styrene copolymers, and mixtures of these modifiers with or without the addition of a synergistic quantity of polymerized pentadecylmethacrylate.

In a conventional process for separating wax from oils, the oil is dissolved in a solvent such as propane or a mixture of solvents at an elevated temperature and then the solution is chilled to a sufficiently low temperature to effect precipitation of the wax which is subsequently removed by filtration, settling, or centrifuging. It is known that various materials, generally referred to as wax separation aids or wax crystallization regulators, when incorporated with the oil during the dewaxing process, aid materially in the separation of the wax from the oil.

In such a conventional process for separating wax from a waxy oil, the oil to be treated is admixed with a wax separation aid and with a selective solvent which shows a preferential solubility for oil over wax at the dewaxing temperature, such as propane or a normally liquid solvent or solvent mixture, such as toluene-acetone, pentane, benzene-methyl ethyl ketone, methyl isobutyl ketone, or other dewaxing solvents known in the industry. The resulting solution is then chilled to a sufficiently low temperature to effect precipitation of the wax which is subsequently removed by filtration, settling, centrifuging, or the like. The concentration of the wax separation aid based on the oil to be treated is often within the range of from 0.01 to 5 weight percent, although concentrations outside this range can be employed, depending primarily on the dewaxing aid and the specific oil treated, and also on the specific process conditions employed.

Oil dewaxing processes of the type above-described are conducted under conditions dependent to a large extent on the selective solvent employed. In propane dewaxing, the propane-oil mixture is often cooled to a temperature within the limits of −40° F. to −60° F. For example, when dewaxing a lubricating oil such conditions provide for reduction of the pour point from about 75° F. or higher to about 0° F. or lower. When employing a normally liquid hydrocarbon solvent, the solvent-oil admixture is generally cooled to a temperature 30 to 50° F. below the desired pour point of the oil, under which conditions the required amount of dewaxing is generally obtained. When employing a ketone or ketone-containing solvent, the solvent-oil admixture is generally cooled to a temperature approximating the desired pour point of the oil, under which conditions the required amount of dewaxing is generally obtained. In any such solvent dewaxing process, the separation aid employed to promote dewaxing is precipitated with the wax.

The crystal regulators appear to influence the growth of the paraffin wax crystals in such a manner that crystal aggregates are formed, which on filtration produce a more or less porous cake, easily permeable to oil. It is thus of economic advantage to provide crystal growth regulators which will allow the most rapid filtration of oil for wax removal.

It is an object of this invention to provide a new wax crystal modifier. It is another object of this invention to provide an improved process for dewaxing of mineral oils. It is a further object of this invention to reduce the filtration time of oils in a dewaxing process.

These and other objects are achieved by the process of my invention as set forth in this specification and the appended claims.

Summary of the invention

According to my invention, certain hydrogenated polymers of butadiene are used as wax crystal modifiers in a dewaxing process. These polymers include hydrogenated polybutadiene, hydrogenated carboxylated polybutadiene, and hydrogenated carboxylated butadiene-styrene copolymer. Further according to my invention, any of the above wax crystal modifiers can have added thereto a synergistic quantity of polymerized pentadecylmethacrylate which aids even further in improving the efficiency of the dewaxing process.

Description of the preferred embodiments

The polymers of butadiene which are suitable for use in the process of my invention are prepared by methods known in the art. The polymers which appear to be most useful in the practice of my invention preferably have a molecular weight in the range of 3,000 to about 150,000. As is stated above, my invention contemplates the use of polybutadiene which has been hydrogenated only, or which has been carboxylated and hydrogenated. It also contemplates the use of butadiene-styrene copolymer which has been carboxylated and hydrogenated. The butadiene-styrene copolymer suitable for use in the process of my invention can have a butadiene to styrene weight ratio of from about 9:1 to about 1:9, preferably from about 9:1 to about 1:1. These copolymers can be made in any manner known to the industry, such as by emulsion polymerization or by solution polymerization with known organometal initiators. For example, the method set forth in U.S. Patent No. 2,975,160 to Zelinski is a suitable method for making a random butadiene-styrene copolymer suitable for use in my invention.

The butadiene polymers and butadiene-styrene copolymers suitable for use in my invention are hydrogenated by hydrogenation treatment means known in the art. Conventional hydrogenation catalysts, such as the Group VIII metals, compounds, or complexes, and conventional hydrogenation conditions, such as temperatures of 100 to 500° F., pressures of 0 to 1000 p.s.i.g., and reaction times of 1 minute to 10 hours, are used. An excess of hydrogen over that required for complete hydrogenation is usually used, and the polymer is usually hydrogenated in solution in a suitable solvent, such as cyclohexane, toluene, and the like. Examples of suitable catalysts are nickel-kieselguhr, Group VIII salts of organic acids plus Group I-A, II, or III-A organometal reductants (e.g., nickel octoate plus triethylaluminum), rhodium chloride-triphenylphosphine complex, and the like. The Periodic Table referred to is that in the Handbook of Chemistry and Physics, 45th edition, page B-2. After hydrogenation treatment, the unsaturation of the polymer molecule should be from 0 to about 20 weight percent of the theoretical ethylenic unsaturation ($C=C$), preferably below about 10 weight percent $C=C$.

Carboxylation of the polymers can conveniently be effected by bubbling $CO_2$ through a solution of the polymer containing at least one terminal alkali metal atom per molecule followed by treatment of the alkali metal salt with an active hydrogen-containing material such as acid to convert the metal salt groups to carboxy groups. One method for carboxylation of these polymers is disclosed in U.S. 3,225,089, issued to James N. Short on Dec. 21, 1965. Sufficient carbon dioxide is used for stoichiometric carbonation of the polymer. The carboxylated polymers suitable for use in my invention usually have a —COOH content between about 0.5 and about 3 weight percent, preferably between about 1 and about 2 weight percent. This carboxylation precedes the hydrogenation of the polymers.

When used in the process of separating wax from mineral oils, the hydrogenated or carboxylated and hydrogenated polymers are added to the oil in an amount from about 0.01 to about 5 weight percent, and preferably from about 0.025 to about 2 weight percent, of the oil. The polymers, solvent and the oil are mixed at an elevated temperature and stirred to form a homogeneous solution. The temperature is then reduced until the wax and polymers crystallize from the solution. The dewaxing conditions are the same as are used in prior art techniques as described above. Depending upon the particular solvent and desired degree of dewaxing, the mixture may be chilled to a temperature between 0° F. and about −60° F.

The addition of polymerized pentadecylmethacrylate to any of the above listed wax crystal modifiers gives a surprising improvement in dewaxing efficiency as measured by the filtration rate of the solution after wax precipitation. The polymerized pentadecylmethacrylate used has a molecular weight of about 15,000 to 20,000, and is sold as a clear, viscous concentrate in a Mid-Continent solvent refined neutral oil having a viscosity of 150 SUS at 100° F. The concentrate has a specific gravity of 0.9 and a viscosity of 23,000 SUS at 100° F. The concentrate is identified as Acryloid 150. Preparation of the polymer and of related polymers that can also be used is described in U.S. 2,091,627 and 2,100,993, issued to Herman A. Bruson in 1937. These materials, which are usually used as oil concentrates, are polymers of esters of acrylic or alpha-methacrylic acid with primary alcohols having more than five carbon atoms. When the concentrate of polymerized pentadecylmethacrylate is used in combination with one of the wax crystal modifiers of this invention, the total amount of modifier is unchanged, so a total dewaxing aid content of 0.01 to about 5, preferably 0.025 to 2 weight percent, of the oil, is used. The ratio of polymerized pentadecylmethacrylate to hydrogenated polymer is from about 1 to 100 to about 10 to 1, preferably from about 1 to 20 to about 5 to 1.

EXAMPLE I

A hydrogenated carboxylated polybutadiene was prepared by the following recipe.

| | Parts by weight |
|---|---|
| Butadiene | 100 |
| Cyclohexane | 1100 |
| Lithium-methylnaphthalene-isoprene initiator [a] | 0.395 |

[a] The initiator was prepared by reacting isoprene, methylnaphthalene (a commercial mixture of alpha- and beta-methylnaphthalene), and lithium in diethyl ether and solubilizing the reaction product with a small amount of butadiene.

Solvent was added to the reactor through a preheater and the reactor temperature was adjusted to 128° F. The catalyst was then added, followed by the butadiene. Maximum reaction temperature was 131° F., and 100 percent conversion was obtained in 1 hour. The temperature was lowered to 90° F., 1.5 parts of tetrahydrofuran was added, and the temperature was reduced further to 40° F. Carbonation was effected by introducing $CO_2$ through the nozzle of a Pownell Model A T into polymer solution flowing through the annular space in the T. Polymer solution was supplied directly from the reactor to the T under 70–80 p.s.i.g. pressure, and the carbonated solution was discharged into a tank under about 15″ Hg. vacuum. Carbon dioxide was supplied to the T at about 40 p.s.i.g. pressure after passage over activated alumina for water removal. Anhydrous HCl was added to the polymer solution to replace lithium atoms with hydrogen atoms, the polymer solution was filtered through diatomaceous earth to remove LiCl and excess HCl, and 0.5 part of Cyanox SS antioxidant 2,2′-methylene bis(4-methyl-6-tert-butylphenol) was added. The polymer had a COOH content of 1.74 weight percent and a Brookfield viscosity at 77° F. of 252 poises.

The polymer (37.2 g. in 500 ml. cyclohexane) was hydrogenated for 5 hours in a stirred autoclave at 250° F. and 500 p.s.i.g. hydrogen pressure, using 0.0625 g. of $RhCl_3$ in the form of a $RhCl_3 \cdot \phi_3 P$ complex prepared in the following manner:

Fifty ml. of an ethyl alcohol solution containing 0.25 g. of $RhCl_3$ was added to a warmed, stirred solution of 1.875 g. of $\phi_3 P$ in 50 ml. of ethyl alcohol. The mixture was stirred and heated to about 170° F., cooled, and the supernatant liquid decanted. The precipitate was taken up in 100 ml. of cyclohexane and 25 ml. of this suspension was used in the hydrogenation.

Essentially complete hydrogenation was obtained, as indicated by infrared analysis.

Example II

The filtration rate obtained using the polymer prepared in Example I was tested by adding the polymer to 133 g. of hot (about 200° F.) oil. Then, 413 ml. of pentane was added and the mixture cooled to 0° F. The slurry was filtered through Whatman No. 1 filter paper under 10″ Hg. vacuum, and the amount of filtrate collected in 100 seconds was measured. The oil used was a phenol-extracted waxy 50 stock prepared by propane extraction of a vacuum reduced Mid-Continent crude.

The table below shows the amount of filtrate collected in 100 seconds as a function of the weight percent of hydrogenated carboxylated polybutadiene used.

Table 1

| Amount of modifier used, weight percent: | Filtrate collected, g. |
|---|---|
| None | 3–6 |
| 0.033 | 13.7 |
| 0.066 | 30.9 |
| 0.1 | 48.9 |

Example III

A series of filtration runs was conducted to show the synergistic effect of polymerized pentadecylmethacrylate. In this series of tests, a total of 0.15 percent by weight of modifier was used, and the oil was cooled to −30° F. for filtration. In the table below, Modifier A designated hydrogenated carboxylated polybutadiene as prepared in Example I, and Modifier B designates polymerized pentadecylmethacrylate concentrate, i.e., Acryloid 150, containing about 35 weight percent polymer.

TABLE 2

| Amount of modifier used, wt. percent of mixture | | Filtrate collected, g. | Amount of filtrate expected [1] |
|---|---|---|---|
| Modifier A | Modifier B | | |
| 100 | 0 | 15.5 | --- |
| 67 | 33 | 46.8 | 11.5 |
| 40 | 60 | 47.0 | 8.5 |
| 16.7 | 83.3 | 27.8 | 6.0 |
| 0 | 100 | 3.8 | --- |

[1] Figures taken from the straight line connecting the values for 100 percent A and 100 percent B.

It is apparent that a synergistic effect is obtained with the combined crystal modifiers in the disclosed range.

Example IV

A polybutadiene was prepared using the following in recipe:

| | | |
|---|---|---|
| Cyclohexane | Parts by weight | 800 |
| Butadiene | do | 100 |
| Tetrahydrofuran | do | 0.28 |
| sec-Butyllithium | millimoles | 4.50 |

Charge order was as shown, and essentially complete polymerization was obtained in 3 hours at 122° F. The polymer had a molecular weight of 25,000 as determined by measurement of intrinsic viscosity. The unterminated polymer (about 47 grams) was transferred to a hydrogenation reactor, 0.0086 g. of nickel (as nickel octoate) and 0.672 g. of triethylaluminum in cyclohexane were added, excess hydrogen was added and the reaction was allowed to proceed for 1 hour at 350° F. and 400 p.s.i.g. The reactor was cooled to 160° F. and essentially completely hydrogenated polymer was recovered.

The hydrogenated polybutadiene was added to oil as in Example II, and the amount of filtrate collected at −30° F. was measured:

| Polymer, weight percent: | Filtrate collected, g. |
|---|---|
| 0.0 | 10.0 |
| 0.2 | 18.0 |
| 0.4 | 47.5 |
| 0.06 [1] | 53.3 |

[1] Plus 0.09 weight percent polymerized pentadecylmethacrylate.

Example V

To show the synergistic effect of polymerized pentadecylmethacrylate with hydrogenated polybutadiene, the polymer prepared in Example IV was used as a dewaxing agent in admixture with varying proportions of Acryloid 150. The table below shows the amount of filtrate collected in 100 seconds at −30° F.

TABLE 3

| Amount of Modifier Used Wt. % of Mixture | | Filtrate collected, g. | Amount of filtrate expected [1] |
|---|---|---|---|
| Hydrogenated polybutadiene | Acryloid 150 | | |
| 0 | 0.15 | 4 | --- |
| 0.025 | 0.125 | [2] 27 | 6 |
| 0.06 | 0.09 | 53 | 8 |
| 0.10 | 0.05 | [2] 47 | 10 |
| 0.15 | 0 | [3] 14 | --- |

[1] Figures taken from the straight line connecting the values for 100 percent butadiene polymer and 100 percent Acryloid 150.
[2] Interpolated.
[3] Interpolated from the data in Example IV.

Reasonable variation and modification are permissible within the scope of this disclosure without departing from the spirit of my invention.

I claim:

1. Process for dewaxing mineral oils comprising mixing a wax containing oil with a solvent and a dewaxing aid selected from hydrogenated polybutadiene, hydrogenated carboxylated polybutadiene, and hydrogenated carboxylated butadiene-styrene copolymer, and chilling the resultant mixture whereby wax is precipitated.

2. Process of claim 1 wherein said dewaxing aid is present in an amount from about 0.01 to about 5 percent by weight of said oil.

3. Process of claim 1 wherein polymerized pentadecylmethacrylate is added to said mixture as a supplemental dewaxing aid.

4. Process of claim 3 in which the polymerized pentadecylmethacrylate is added as a concentrate in oil.

5. Process of claim 4 wherein the total of said dewaxing agent and said supplemental dewaxing agent concentrate is from about 0.01 to about 5 percent by weight of said oil.

6. Process of claim 3 wherein the ratio of said supplemental dewaxing agent to said dewaxing agent is from about 1:100 to about 10:1.

7. Process of claim 1 wherein said mixture is chilled to a temperature between about 0° F. and about −60° F. to precipitate said wax.

8. Process of claim 3 wherein said mixture is chilled to a temperature between about 0° F. and about −60° F. to precipitate said wax.

References Cited

UNITED STATES PATENTS

| 3,239,445 | 3/1966 | Leonard et al. | 208—33 |
| 3,329,602 | 7/1967 | Moyer | 208—33 |
| 3,419,365 | 12/1968 | Streets | 44—62 |

HERBERT LEVINE, Primary Examiner

U.S. Cl. X.R.

44—62, 80